Fig. 1

United States Patent Office 3,426,878
Patented Feb. 11, 1969

3,426,878
CONTAINER SAFETY GUIDE FOR CONTAINERSHIP LOADING AND UNLOADING
Robert N. Campbell, Jr., Mobile, Ala., and John H. Williams, Jacksonville, Fla., assignors to Sea-Land Service, Inc., Elizabeth, N.J., a corporation of Delaware
Filed Feb. 9, 1967, Ser. No. 614,940
U.S. Cl. 193—38                                        3 Claims
Int. Cl. B65g 11/00, 67/02

ABSTRACT OF THE DISCLOSURE

A mobile framework is positionable on a wharf apron alongside a moored containership and is provided along its top edges with funneling guide elements for cooperating with a ship or shore mounted crane to direct a descending container onto a highway trailer chassis standing within the framework and alternatively for similarly directing a descending gappling spreader frame into coupling engagement with a chassis-supported container within the framework.

---

The present invention comprises a container safety guide for containership loading and unloading and more particularly provides a mobile framework structure, adapted to be positioned on a wharf apron in approximately accurate juxtaposition to a moored containership that is to be loaded or unloaded, and provided with funneling or channeling guide elements for directing into proper seating engagement on a trailer chassis containers being lowered from a shipboard or shore mounted crane and alternatively directing into proper seating engagement on a chassis-supported container a grappling spreader being lowered from the crane, regardless of, and being unaffected by, rolling movements of the ship and consequent swinging of the crane parts resulting from ocean swells or other causes.

The particular embodiment of the invention that is specifically disclosed to illustrate the inventive concept in this application provides apparatus for use in conjunction with containership operations employing means and methods of the general kind disclosed and claimed in Tantlinger Patents 2,946,617 of July 26, 1960; 3,027,025 of Mar. 27, 1962; 3,042,227 of July 3, 1962; and 3,085,707 of Apr. 16, 1963.

In such operations a containership is moored in a dock closely adjacent to a wharf whose edge parallels the ship's side. The ship is provided with a gantry bridge crane movable along its deck and extensible over the side to raise and lower and move laterally of the ship a spreader device between terminal positions lowered over the wharf apron and lowered over the ship's deck or over or into one of the hatchways. The spreader device is a cable-slung rectangular horizontal frame which is equipped with grappling means e.g., twist locks in its four corners, which make detachable engagement with the top of a container whose bottom is detachably connectible to a highway truck trailer chassis so that the container serves as the body of the trailer for land transport of its contents and serves as the sealed enclosure of its contents on shipboard for marine transport.

In the operation of the system it is necessary to position the trailer chassis quite accurately in proper placement longuitudinally of the ship so that the spreader will descend into proper fitting relation of its twist locks with cooperating sockets on the container top when the ship is being loaded and so that the container will descend into proper fitting relation of its connecting couplings with the trailer chassis when the ship is being unloaded.

No difficulty is experienced in establishing and holding the required longitudinal position of the chassis relative to the moored ship's position alongside the wharf.

However, in certain seaports, such as that of Long Beach, Calif., harbor conditions are such that the moored ship tends to roll appreciably in response to a continuous and sizable ocean swell, so that the depending spreader frame, poised over the wharf apron, with or without a container attached to it tends to swing laterally to and from the ship's side. This militates seriously against making seating engagement of the spreader on the container in loading the ship and making seating engagement of the container on the chassis in unloading the ship, and the effect has been to induce long delays in the loading and unloading operations, to require extraordinary skill on the part of the crane operator, and in many cases to cause damage to the containers, the chassis and/or the spreader.

Even in seaports where sizable ocean swells are not experienced the problem of making seating engagement of the container on the chassis without delay, and without damage to the container or chassis, still exists, although to a lesser degree. The reason is that the built-in guidance features of the container and chassis provide so little gathering that the operator must have his trolley very accurately positioned to insure mating on the first try.

The purpose of the present invention is to eliminate the foregoing deficiencies of the basic equipment and its mode of operation by providing an adjunct device in the form of a framework capable of enclosing a chassis on the wharf apron, with or without a container mounted on it, and of guiding the descending spreader into proper engaging relation with the container, or of guiding the descending container into proper engaging relation with the chassis, regardless of rolling of the ship and consequent swinging movement of the suspending cables.

In the achievement of this objective the invention provides a portable or mobile tunnel-like housing wide open at its front and rear ends and at its top, which can be set in proper longitudinal relation to the ship and have a trailer chassis driven into it, which will accept a container or spreader descending into its open top even though considerably off-center and misaligned longitudinally and guide the container or spreader into a shifted position directed accurately into fitting engagement with the subjacent chassis or container.

The foregoing being the principal object of the invention, an important subsidiary object attained by the preferred embodiment of the invention hereinafter disclosed comprises incorporating in the device means rendering the framework movable during use in a direction laterally of the ship responsive to a trailer chassis entering the framework enclosure in laterally off-center misalignment. The effect of this feature is to accommodate vehicles moved to loading or unloading position without requiring exercise of great accuracy by the drivers so that considerable time is saved by eliminating the otherwise necessary repeated backing and forward movements of the tractor vehicle.

Another auxiliary object of the invention is to equip the framework with mounting wheels or casters and with towing means cooperative with the standard fifth wheels of the tractors that pull the trailer chassis so that the framework is readily moved into and out of operative position on the wharf.

A general object is to provide equipment of the character indicated in rugged and efficient form designed to endure all reasonably to be expected rough treatment and abuse and particularly to withstand without damage to itself or to the shipboard mounted or rolling stock equipment heavy blows incident to ship movement and the misalignment conditions above indicated.

With the foregoing and other objects and advantages in view, the invention, in a preferred form of embodiment that has been reduced to actual practice and found to be entirely satisfactory, and which is accordingly at present preferred, is illustrated in the accompanying drawings, in which.

Figure 2:
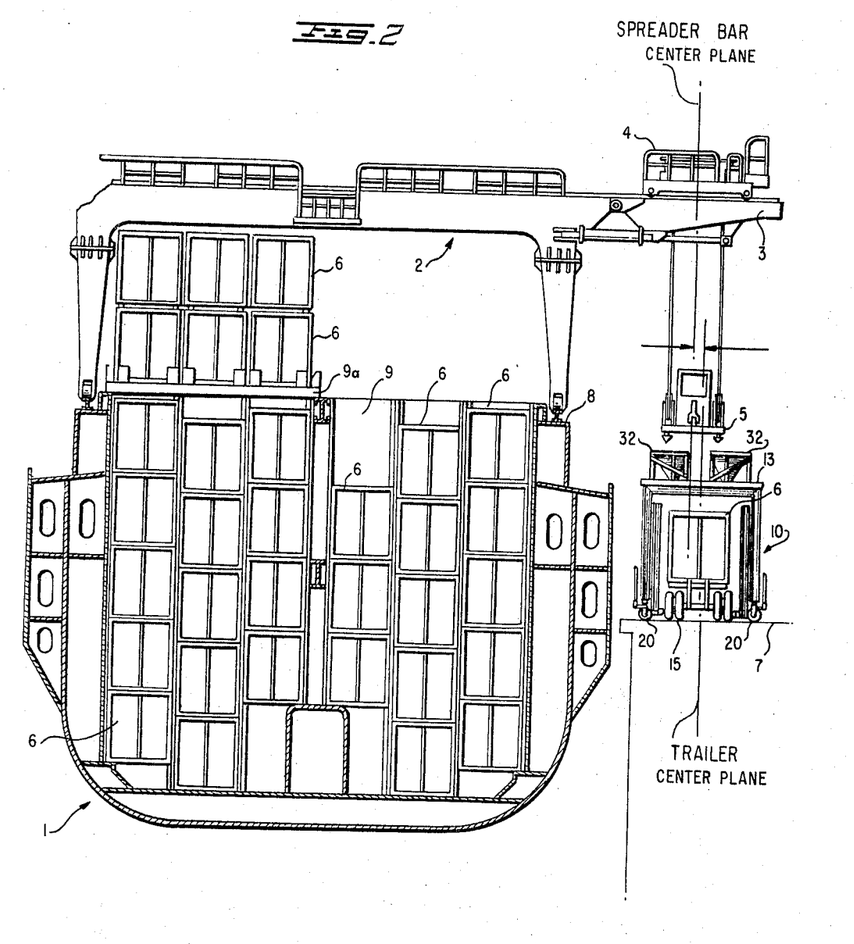
FIG. 2 is a cross sectional view of the hull of the ship, showing in rear elevation the safety guide with a container-bearing trailer chassis positioned inside it and a spreader frame being lowered by the shipboard gantry bridge crane in lateral misalignment with the container to be coupled for hoisting.

In these figures, as shown in FIG. 2, the reference numeral 1 designates generally the hull of a containership having a deck-mounted gantry 2 movable longitudinally along the hull and provided with an extensible jib 3 from which a bridge crane 4 raises and lowers and laterally moves a spreader frame 5 between coupling and uncoupling relation with a container 6 on the wharf apron 7 and a position on the deck 8 of the ship, or within one of the hatchways 9, or on a hatch cover 9a of the ship.

The general arrangement of this structure and its operation is explained in the Tantlinger patents hereinabove cited and forms no part of the present invention.

Figure 1:
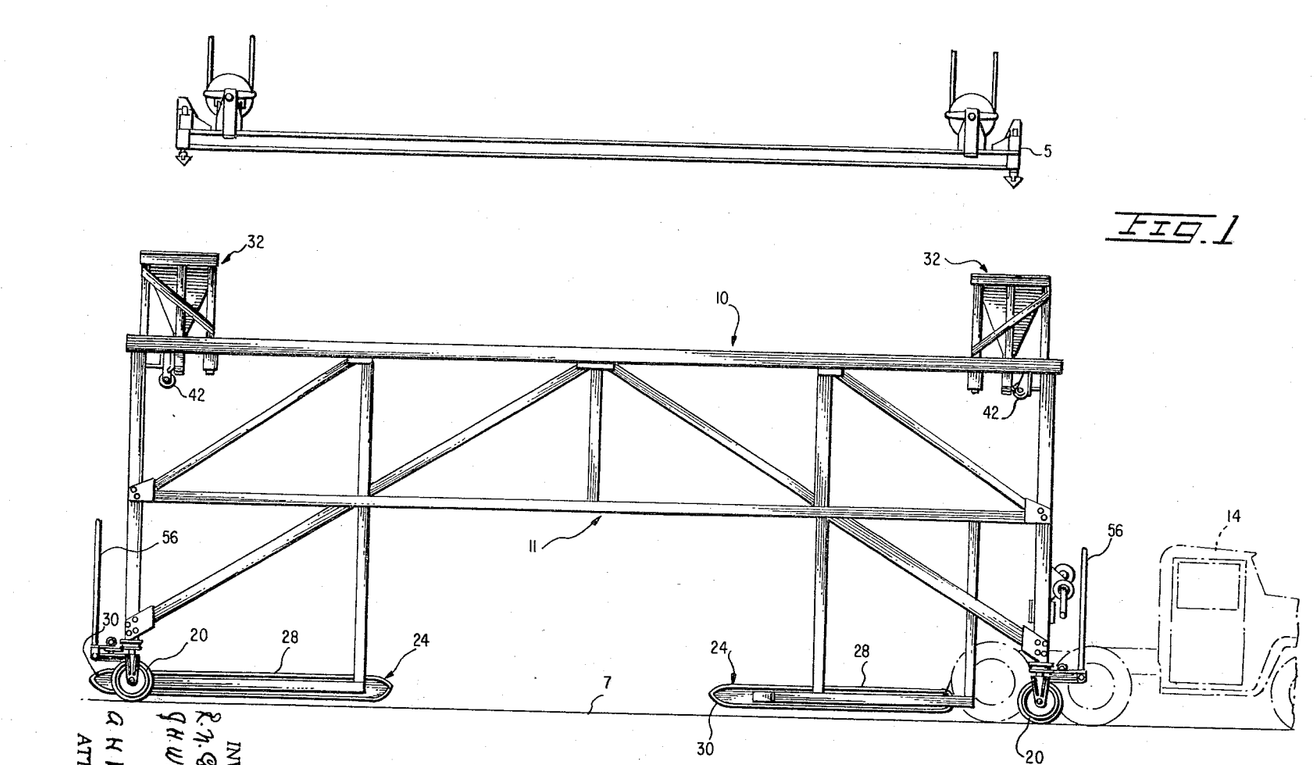
FIGURE 1 is a side elevational view of the container safety guide, shown as having been pulled into position on a wharf apron alongside a moored ship, in longitudinal alignment with a spreader frame being lowered from the deck of the ship.

The preferred form of container safety guide provided by the presently disclosed embodiment of the invention comprises a framework generally designated 10 which is fabricated principally of stout structural steel members and consists basically of two identical vertical side frames 11 rigidly connected together at their front ends by a top cross member 12 and similarly at their rear ends by a top cross member 13. The framework is thus of generally box shape, wide open at its front and rear ends, with a wide open top, and constitutes a sort of tunnel housing with appropriate space between the parallel side frames 11 and adequate clearance beneath the two cross members 12, 13 to permit a tractor-trailer highway truck vehicle, including a container 6 as the trailer body, to be driven into and through the housing. In FIG. 1 the tractor is shown at 14, and in FIGS. 2, 3, 4 and 5 the running gear of the trailer chassis is designated 15.

Figure 3:
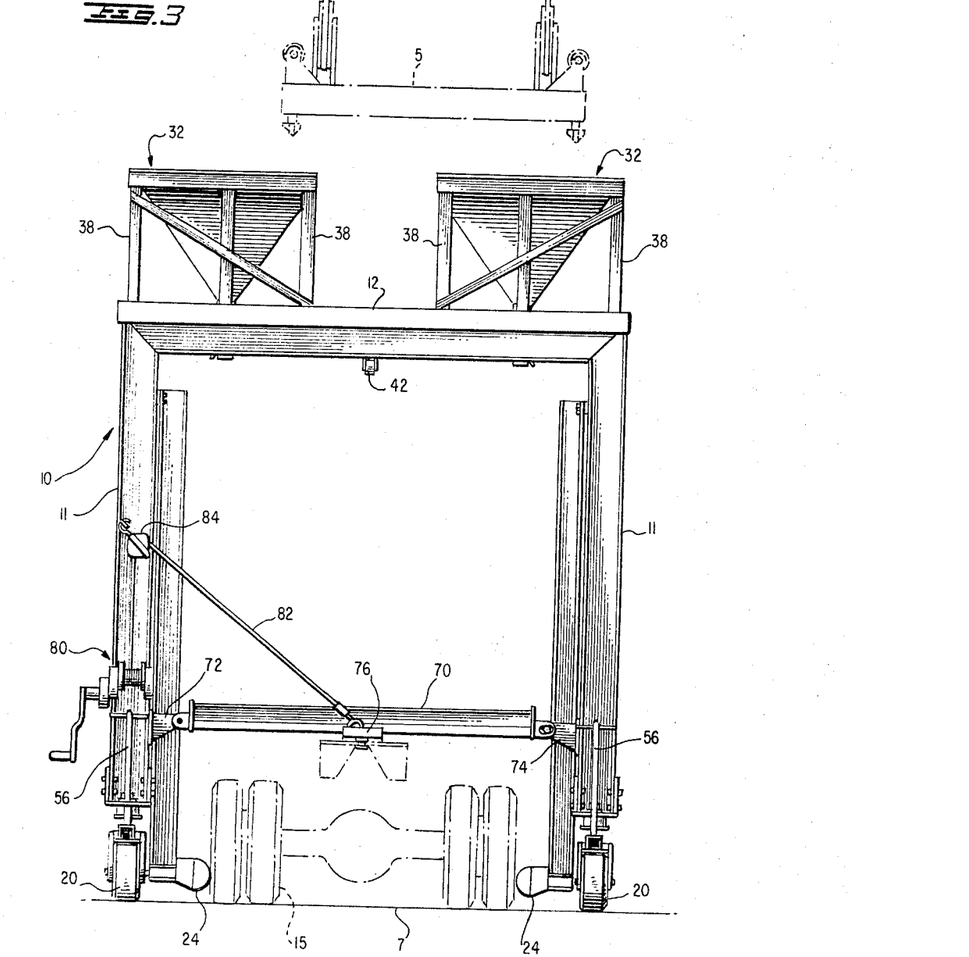
FIG. 3 is a front end elevational view of the container safety guide with the trailer chassis and the spreader frame indicated in the misaligned relationship of FIG. 2, but with the container omitted for clarity of illustration.
Figure 4:
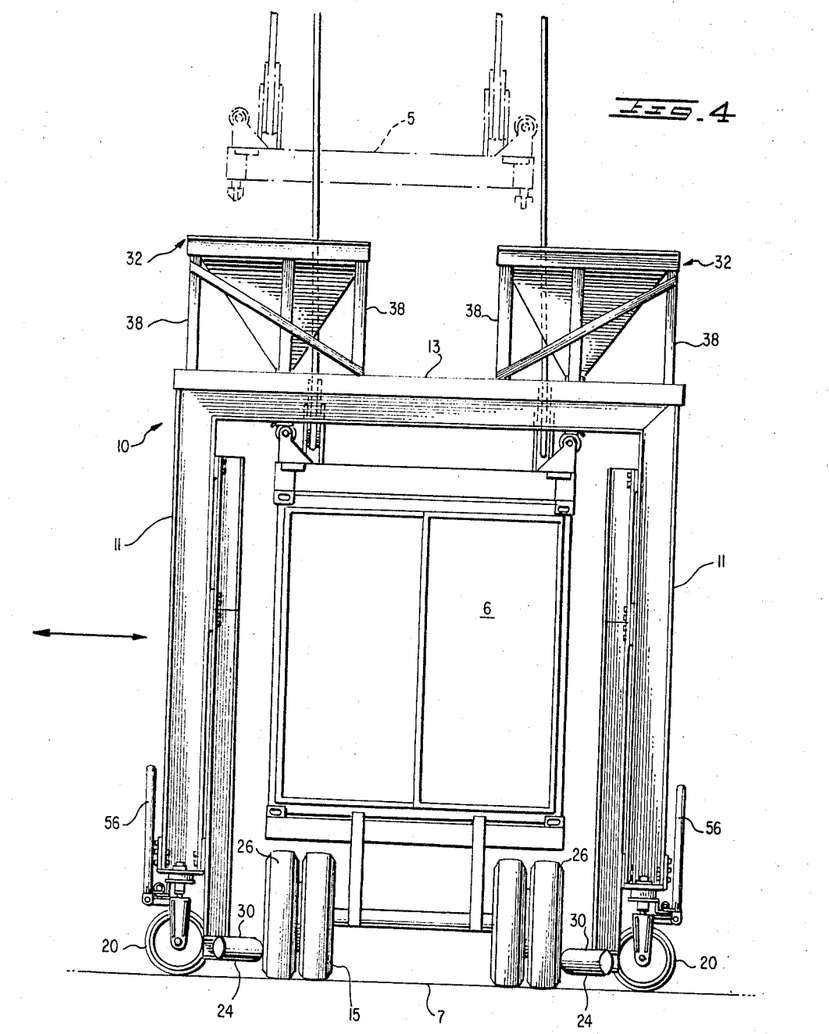
FIG. 4 is a rear end elevational view of the container safety guide with the parts in the misaligned relation shown in FIGS. 2 and 3 but with the supporting wheels or casters of the guide framework swivelled ninety degrees to permit lateral movement of the framework in the direction of the double arrow of the figure.

The preferred safety guide framework is intended to be mobile for movement along the wharf apron and for that purpose is provided with supporting wheels 20 in the form of casters, preferably four in number, one at each lower corner of the framework (compare the front and rear views of FIGS. 3 and 4). Each of the wheels is swiveled for rotation about a vertical axis between one position in which the axis of wheel rotation is transverse to the lengthwise axis of the framework, as shown in FIG. 3, so that the framework can be rolled forwardly or rearwardly along the wharf apron, and another position in which the axis of wheel rotation is parallel to the lengthwise axis of the framework, as shown in FIG. 4, so that the framework will be restrained against forward or rearward rolling but can be rolled laterally, in the direction of the double arrow of FIG. 4. The details of a preferred form of mounting of the wheels or casters will be described hereinafter.

Figure 5:
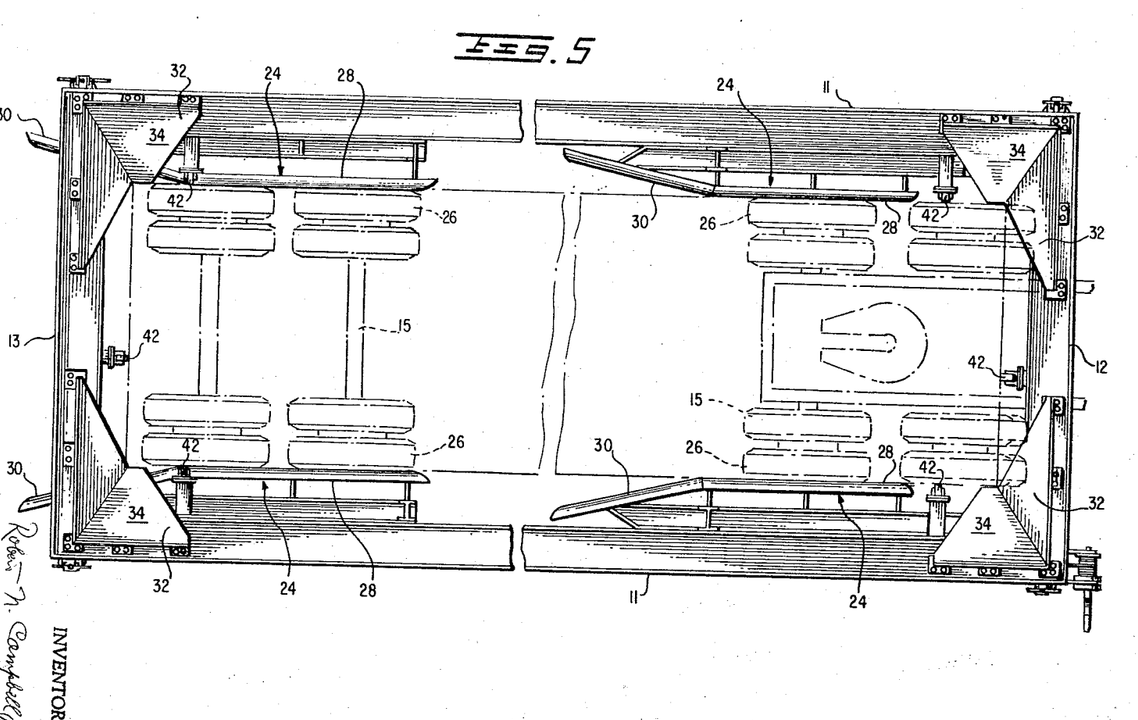
FIG. 5 is a top plan view of the guide framework showing in phantom lines the running gear of a trailer chassis positioned inside the framework.

The spacing of the two side frames 11 is appreciably greater than the maximum width of the vehicle, tractor, trailer and container-body, that will be driven into the framework, as appears in FIG. 4. However, the lower inside of each of the side frames is provided with trailer wheel engaging guide rail means 24. These are four in number, two in the forward quarter of the framework and two in the rear quarter, as best seen in FIG. 5, and the lateral spacing of these rails is quite accurately fixed at just a little more than the distance between the outer side walls of the outboard tires 26 of the trailer running gear 15 as shown in FIG. 5. The location of the rails 24 is low, for engagement by the outboard tires well below the wheel hubs, and each of the rails comprises a straight forward portion 28 and an outwardly flaring rear portion 30. The flaring rear portions 30 of rear pair of rails project out beyond the plane of the rear opening of the framework, into which the tractor-trailer vehicles are to enter as will be hereinafter described, and as shown in FIGS. 1 and 5. It will be recognized that the arrangement is such that, with the supporting wheels 20 set to permit lateral movement of the framework, as shown in FIG. 4, a vehicle entering the framework through its rear, i.e., beneath the rear cross member 13 as seen in FIGS. 4 and 5, and off center from the framework, i.e., laterally misaligned even to a considerable extent, although not too much to prevent rubbing engagement of the front tires with the flaring portions 30 of the rear rails 24, will forcibly shift the framework to the left or right until the framework becomes accurately centered over the vehicle. The initial such shifting movement swings the rear end portion of the framework in the direction of one of the heads of the double arrow of FIG. 4; thereafter the advancing front wheels of the vehicle make engagement with the flaring rear portions 30 of the front guide rails 24 and the front end portion of the framework similarly shifts laterally. When the vehicle comes to rest within the framework, as shown in FIG. 5, the front and rear wheels, or the outboard side walls of the tires thereof, are substantially engaged with the straight portions 28 of the guide rails and the framework 10 is accurately positioned over the vehicle. Or, in other words, the vehicle is accurately centered within the framework, at least insofar as lateral relationship of framework and vehicle is concerned.

Figure 6:
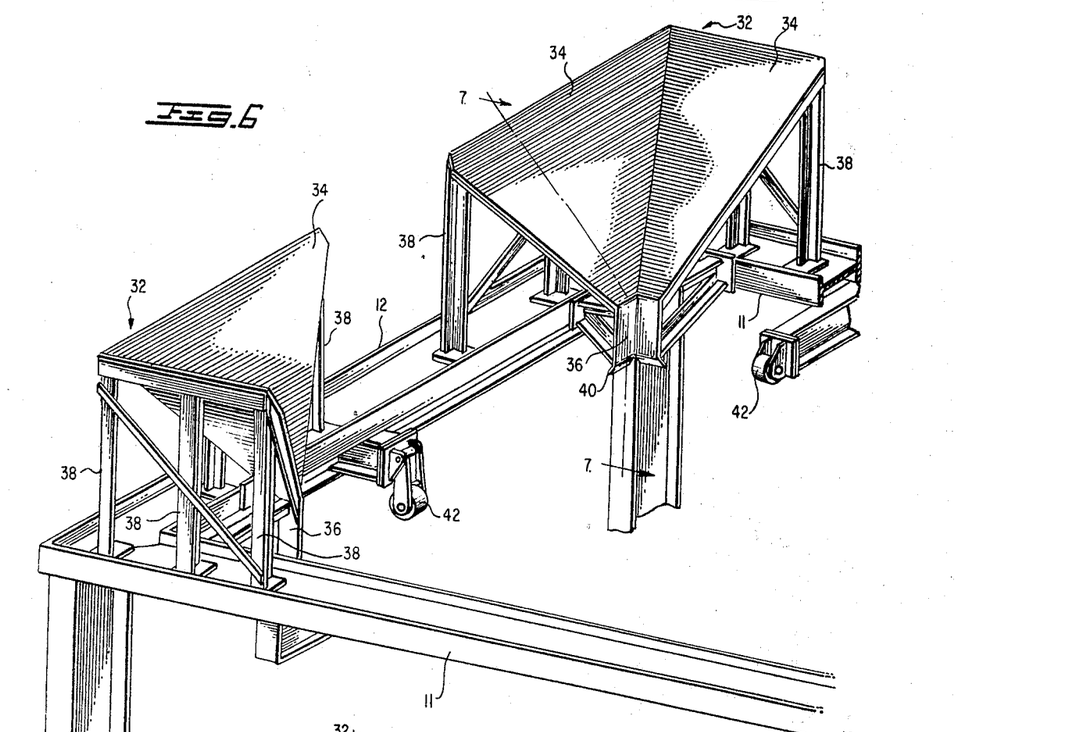
FIG. 6 is a perspective detail view of one end portion of the upper portion of the guide framework.
Figure 7:
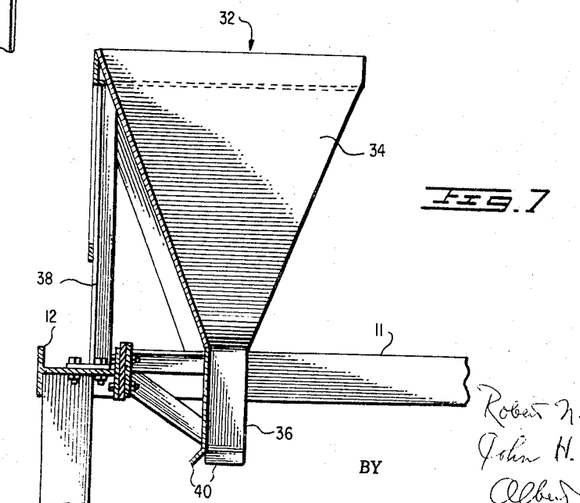
FIG. 7 is a detail sectional view, taken along the line 7—7 of FIG. 6 showing one of the corner chute structures.

In order to guide a descending spreader frame accurately down into seating engagement on the container body 6 of a vehicle centered in the framework as just described, or to guide a descending container accurately down into seating engagement on the centered chassis of such a vehicle, the upper portion or top of the framework is provided with funnel type chute structures 32 at the four corners of the framework. Each of these chute structures consists of two downwardly and inwardly converging plates 34, each of them generally triangular in shape, and both converging at their lower ends in a short vertical way 36 formed of a length of angle iron. As best shown in FIGS. 6 and 7, each of the chutes is braced on the top stringer of the adjacent side frame 11 and front top cross member 12 (or rear top cross member 13) by appropriate strong struts 38. While the chutes may be entirely within the plan projection of the outer planes of the framework, as shown in FIG. 5, their lower ends are well inside that projection and the four ways 36 are symmetrically arranged within the framework outline to constitute the four corners of an area shaped and dimensioned so as to fit and pass a container or a spreader frame with reasonably snug clearance between the ways 36 and the spreader frame corners and between the ways and the corner posts of the container. Downwardly and outwardly flaring ends 40 may be formed on the bottoms of the ways to facilitate entry of the spreader frame or the container upon the hoisting of either up out of the framework.

It may be found desirable in some cases to add a set of guide rollers 42 on bracket structures mounted on the upper structure of the side and end frames and projecting into the framework opening to insure re-entry of the spreader into the guide flares 40 when the relationship of a particular spreader and the ways or guides 36 is such that, when the spreader is seated on a container, the top of the spreader is below the bottom of the guides 36. In such a case the effective height of the spreader may be increased by providing it with upstanding vertical plates (not shown) to cooperate with the rollers 42 and thus guide the spreader back up out of the framework. Three such rollers are shown at each end portion of the structure in FIG. 5, and two of them are illustrated in more detail in FIG. 6. They will not be required where the spreader is designed specially to fit down into the framework to a seated position on a container while its corner rollers remain engaged with the ways 36.

Figures 8, 9:
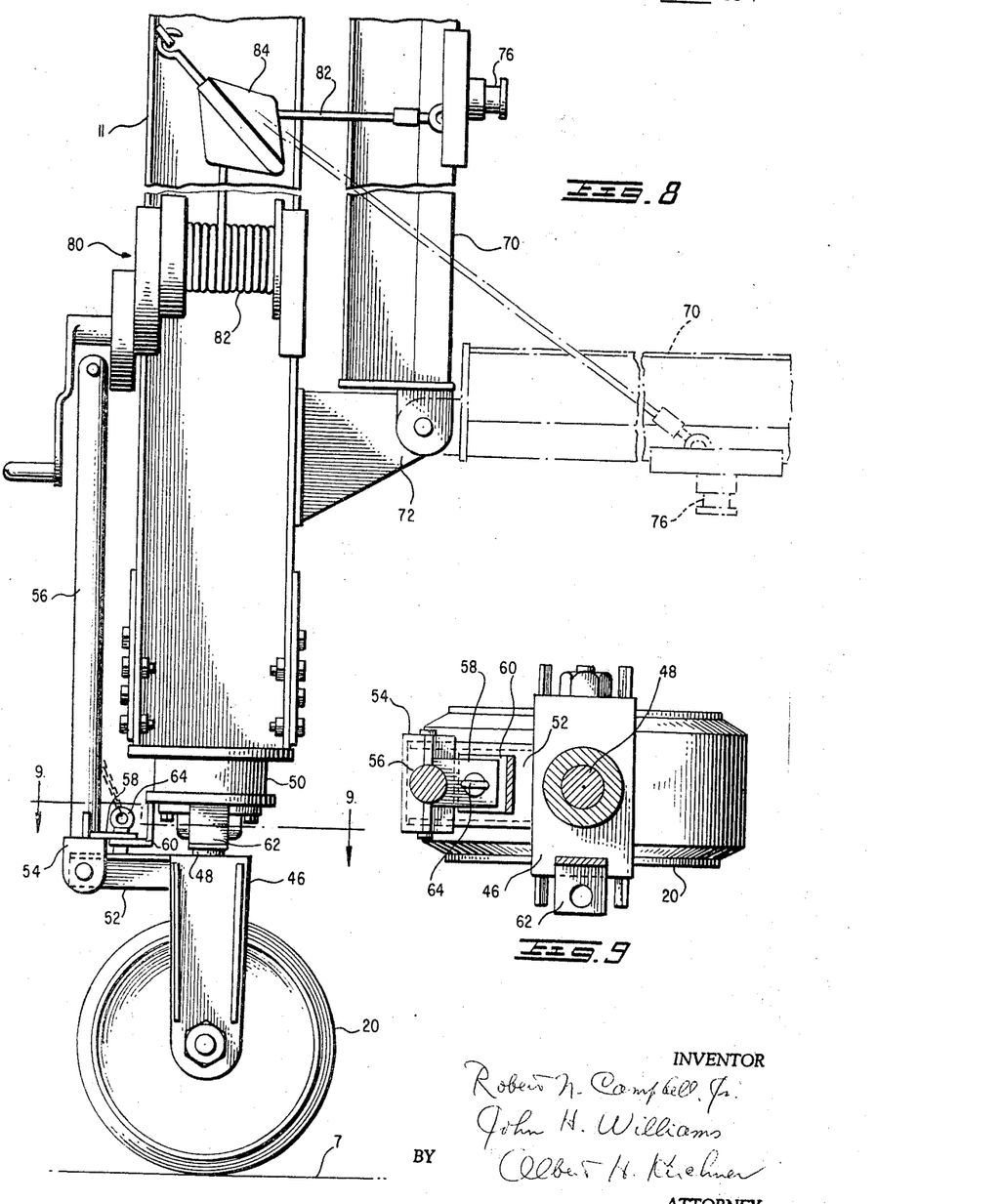
FIG. 8 is a relatively enlarged detail elevational view of the lower front portion of one of the side frames of the guide framework.
FIG. 9 is a horizontal cross sectional view taken on the line 9—9 of FIG. 8.

The swiveled mountings of the wheels or casters 20 are illustrated by FIGS. 8 and 9 while show the arrangement at the righthand front corner of the framework on a larger scale than appears in FIG. 3. The other three mountings are identical. Each of them consists of a yoke 46 journaling the steel caster and an upstanding kingpin 48 journaled in a thrust bearing 50 secured to the bottom of the corner of the framework. Right angularly projecting from the top of the yoke 46 is an arm 52 to the outer free end of which is pivoted a clevis 54 which is welded to the bottom of a handle 56. A plate 58 extends inwardly from the top of the clevis and has a hole that registers with a mating hole in a side plate 60 or an end plate 62 that extends respectively outwardly and forwardly, at a spacing of 90 degrees apart, from the thrust bearing 50. A pin 64 is chained to the lower part of the handle and keys the plate 58 to either of the plates 60, 62, depending on the setting of the caster 20 in one or the other of its two positions, with the handle upturned to retracted position, all as shown in FIG. 8. The pin 64 is withdrawn and the handle lowered toward horizontal position to swivel the caster to its other position, whereupon the handle is retracted, and the pin inserted in the newly registering holes, as will be understood.

The front end of the framework is provided with draft means by which the structure may be towed into and out of position for use. In the illustrated embodiment of the invention this comprises a tow bar 70 which is hinged or pivoted at one end to a bracket 72 welded to the inner surface of the corner upright or post at the front of one of the side frames, e.g., the righthand front depicted in FIG. 8. The free end of this tow bar is made latchable to a keeper bracket 74 welded on the front corner post of the opposite side frame in any suitable fashion, as by the mating hole and pin arrangement indicated in FIG. 3. The tow bar is provided at its center with a kingpin 76 for coupling to the standard fifth wheel of a tractor 14 in the same manner as the similar pin of a trailer running gear 15. The tow bar is raised from its operative position shown in FIG. 3 to retracted inoperative position as shown in full lines in FIG. 8 by means of a hand winch 80 mounted on the framework upright or post that carries the tow bar hinge bracket 72 and a cable 82 trained over a pulley 84 and connected to the tow bar, all as shown in FIGS. 3 and 8.

In the operation of the apparatus:

For loading containers onto the ship, the tow bar 70 is lowered and latched in the operative position shown in FIG. 3. With the four wheels set by the handles 56, pins 64 and plates 52 and 60 in the position shown in FIG. 8, with their axes parallel to the longitudinal axis of the structure, a tractor 14 is backed into the front end of the framework to couple the tow bar pin 76 to the fifth wheel of the tractor. The wheels 20 are then turned by the handles 56 and fixed in their other position, with their axes transverse to the longitudinal axis of the structure, as shown in FIG. 3, the tractor is started forward, and the framework is towed to the required position longitudinally of the moored ship, directly opposite the deck or hatchway location where the containers are to be stowed and at an approximation of the correct distance from the near side of the ship. In order to facilitate establishing this placement, indexing markers may be provided on the framework and on the tractor and the wharf apron, which need not be described or illustrated inasmuch as they form no part of the present invention.

The wheels 20 are then turned ninety degrees and fixed in their FIG. 4 position, preventing longitudinal movement of the framework but permitting lateral movement, the tractor is uncoupled and driven away, and the tow bar is retracted to its inoperative position shown in full lines in FIG. 8.

A tractor-trailer combination, with a container 6 mounted on the trailer chassis, is then driven into the framework, entering from the rear and stopping to position the container substantially centrally of the length of the framework, symmetrically with relation to its front and rear ends. Stopping at the proper position is facilitated by suitable indexing and marking devices similar to those used for positioning the framework, or certain mechanical, optical or aural signaling devices described and claimed in a separate copending patent application may be installed in the framework for this purpose.

In making its entry into the framework the tractor, and the trailer, may not be accurately centered. But this is immaterial (unless of course the misalignment is inordinately great) because the outboard side walls of the tires on one side of the vehicle will strike the inwardly sloping surface of one or both of the flaring rear portions 30 of the guide rails 24 and shift the framework laterally on its wheels 20 to bring the framework to a position in which the straight front portions 28 of the guide rails fairly snugly engage the adjacent vehicle tires, as shown in FIG. 5.

The couplings securing the container 6 to the trailer chassis are then disconnected and the gantry crane operator proceeds to lower the spreader 5 from the extended jib 3 down through the open top of the framework 10 for coupling of the twist lugs or equivalent devices of the spreader to the cooperating sockets or the like on the top of the container.

Now, assuming the ship is rolling, as the result of ocean swells or for any other reason, the swinging of the spreader frame on its hanging cables may produce an appreciable misalignment of the longitudinal center plane of the spreader and that of the container as indicated in FIG. 2, and the instantaneous displacement at the approach of the spreader to the container top can be considerable, particularly when the ship is light and rides high out of the water so that the spreader must hang by a substantial length of cable. However, unless the displacement is inordinately great (greater than that indicated in FIG. 4), one side or the other of the spreader frame will strike the adjacent plates 34 of the two chute structures 32 on that side of the framework and the spreader will be shifted laterally and guided down the sloping chutes and into substantial contact with all four of the ways 36 to settle down accurately into proper seating on the container top with immediate coupling of the spreader twist lugs and the container top sockets.

The spreader is then hoisted, with the spreader guided into the ways 36 by the bottom flares 40, followed by the container which is then carried across the ship's deck and lowered into stowed position in or on the vessel in the manner which forms the subject of the Tantlinger patents hereinbefore listed. The tractor is then started up to pull the empty trailer out through the front of the framework, and another tractor, pulling a loaded trailer, is driven into the rear end of the framework and the operation repeated.

The operation of the apparatus in the unloading of the ship is similar, as will be understood. Suffice it to say that in this operation the framework is initially located opposite the crane location in the manner that has been explained, the framework is fixed against longitudinal movement by setting the casters against fore and aft rolling, a trailer chassis is driven into the framework, and the crane is operated to lower a container, depending from the spreader frame, down through the open top of the framework.

If the center plane of the descending container is misaligned with the center plane of the framework (and hence also that of the trailer chassis) the bottom of one side of the container will strike the adjacent plates 34 of the two chute structures 32 on that side of the framework and the container will be shifted laterally and guided down the sloping chutes and into substantial contact with all four of the ways 36 to settle down accurately into proper seating on the trailer chassis with interfitting of the chassis and container securing means. The spreader is then uncoupled from the container and hoisted and traversed across the ship's deck to pick up another container for lowering onto a new chassis that has now replaced the first one in the framework.

It is to be noted that, within the broad principles of the invention, as defined by the more broadly worded of the appended claims, the framework may be constructed and used without the benefit of the supporting wheel means of the preferred hereinabove described embodiment. Such a structure can be suspended from the frame of a shore mounted crane by structural members so arranged that the structure is free to move inshore or outshore, but is restrained from moving longitudinally along the dock. This structure, so mounted, would move along the wharf with the shore mounted crane, always remaining in proper registry with the shore mounted crane, and will be productive of all benefits of funneling the container into alignment with the chassis in unloading and similarly directing the spreader frame onto the container in loading. These benefits are considerable, because they materially speed up the handling of the containers, they substantially reduce the likelihood of container roof damage by descent of the spreader frame with its coupling lugs or twist locks misaligned with the sockets in the fittings in the tops of the container corner posts, and they substantially reduce the likelihood of chassis damage by descent of a container too badly misaligned with the chassis to permit the chassis and container guidance features to be effective.

It is believed to be evident from the foregoing brief explanation of the illustrative embodiment of the invention depicted in the accompanying drawings that the invention satisfactorily accomplishes all the objectives stated in the introduction to this specification. In the interest of clarity of disclosure, many of the structural and engineering details of the structure have been omitted. It is believed that all such will be sufficiently obvious to those skilled in the art. It is also believed to be obvious that numerous changes in details, substitution of equivalents, and omission of elements may be practiced without departing from the principles of the invention as defined by the appended claims.

We claim:
1. In a container safety guide means for containership loading and unloading of the type in which a highway trailer chassis is driven into a mobile four-sided upright framework of open top construction positioned on a wharf apron and chute structures are provided at the four upper corners of the framework for funneling a descending container down into centered position in the framework, the improvement comprising a supporting wheel at each lower corner of the framework for rolling movement along the ground, a yoke journaling each wheel, means mounting each yoke on the framework for swiveling movement between a position in which the wheel axis is parallel to the longitudinal axis of the framework and another position in which the wheel axis is normal thereto, means for positioning the wheel in either of said positions and latching it therein comprising an arm outstanding horizontally from the yoke, plate means outstanding from the framework having portions separated 90° relative to the wheel axis and registrable with said arm in the respective positions of the yoke, means for coupling the arm to the plate means selectively in each of said two positions of the yoke, and an operating handle hinged to the arm for movement from a horizontally extended operating position to a vertical retracted inoperative position.

2. The combination claimed in claim 1, in which the arm and plate means are formed with holes registrable in the two positions of the arm for reception of a coupling pin.

3. The combination claimed in claim 1, in which the arm and plate means are formed with holes registrable in the two positions of the arm for reception of a coupling pin, and a coupling pin is secured to the handle by a short flexible connection so that when the handle is in retracted position the pin may be inserted in registering holes and the handle held retracted.

References Cited
UNITED STATES PATENTS

| | | | |
|---|---|---|---|
| 3,024,919 | 3/1962 | Willison et al. | 212—14 |
| 3,111,212 | 11/1963 | Garland et al. | 193—38 |
| 3,120,316 | 2/1964 | Luchford | 212—14 X |
| 3,169,648 | 2/1965 | Tantlinger | 193—38 X |
| 3,255,499 | 6/1966 | Crowell et al. | 193—41 |
| 3,085,285 | 4/1963 | Morlik | 16—35 |

EVON C. BLUNK, *Primary Examiner.*

M. L. AJEMAN, *Assistant Examiner.*

U.S. Cl. X.R.

193—41; 214—38, 41